United States Patent
Yuki et al.

(10) Patent No.: US 10,747,529 B2
(45) Date of Patent: Aug. 18, 2020

(54) VERSION MANAGEMENT SYSTEM AND VERSION MANAGEMENT METHOD

(71) Applicant: HITACHI, LTD., Tokyo (JP)

(72) Inventors: Teruhisa Yuki, Tokyo (JP); Suill Hong, Tokyo (JP); Tatsuya Yamada, Tokyo (JP)

(73) Assignee: HITACHI, LTD., Tokyo (JP)

( * ) Notice: Subject to any disclaimer, the term of this patent is extended or adjusted under 35 U.S.C. 154(b) by 385 days.

(21) Appl. No.: 15/757,089

(22) PCT Filed: Dec. 13, 2016

(86) PCT No.: PCT/JP2016/087020
§ 371 (c)(1),
(2) Date: Mar. 2, 2018

(87) PCT Pub. No.: WO2018/109825
PCT Pub. Date: Jun. 21, 2018

(65) Prior Publication Data
US 2020/0225938 A1 Jul. 16, 2020

(51) Int. Cl.
*G06F 9/44* (2018.01)
*G06F 8/71* (2018.01)
*G06F 9/445* (2018.01)

(52) U.S. Cl.
CPC .............. *G06F 8/71* (2013.01); *G06F 9/445* (2013.01)

(58) Field of Classification Search
None
See application file for complete search history.

(56) References Cited

U.S. PATENT DOCUMENTS

| 6,915,452 B2 * | 7/2005 | Froehlich ............... G06F 8/656 714/28 |
| 8,285,876 B2 * | 10/2012 | Chua ..................... G06F 9/465 709/220 |
| 8,707,287 B2 * | 4/2014 | Raundahl Gregersen ............... G06F 8/656 717/168 |
| 2014/0245279 A1 * | 8/2014 | Ohtake .................. G06F 9/445 717/170 |

FOREIGN PATENT DOCUMENTS

| JP | 8-194671 A | 7/1996 |
| JP | 2008-108155 A | 5/2008 |
| JP | 2010-128851 A | 6/2010 |
| WO | WO 2013/094003 A1 | 6/2013 |

* cited by examiner

*Primary Examiner* — Anna C Deng
(74) *Attorney, Agent, or Firm* — Baker Botts L.L.P.

(57) ABSTRACT

A version management system includes a storage device that retains information on version histories of services each providing a predetermined function in a predetermined system, and an arithmetic device that executes a process of generating, based on the information on the version histories, a list of combination patterns of versions of the respective services as system configurations of the system, a process of excluding, from the patterns in the list, the pattern having a function fallback rate equal to or above a predetermined level, the function fallback rate being based on predefined necessary functions, and a process of identifying, in the patterns remaining in the list after the exclusion, the pattern with the highest similarity to a system configuration having a predetermined past operational track record, as a system configuration to which the system is to be restored upon occurrence of a problem.

6 Claims, 16 Drawing Sheets

SYSTEM CONFIGURATION INFORMATION MANAGEMENT DB (SYSTEM α CONFIGURATION INFORMATION TABLE)

| CREATION DATE AND TIME 1500 | DELETION DATE AND TIME 1501 | UPDATE DATE AND TIME 1502 | SERVICE NAME 1503 | VERSION 1504 | UPDATE HISTORY 1505 | 1251 |
|---|---|---|---|---|---|---|
| 2012 05-12 10:00:00 | NULL | 2012 07-15 10:00:00 | SERVICE A | 1.2.0 | VERSION UPGRADE | |
| 2012 05-12 10:00:00 | NULL | 2012 09-03 10:00:00 | SERVICE B | 1.1.0 | ADDITION OF FUNCTION L | |
| 2012 05-12 10:00:00 | NULL | 2012 06-12 10:00:00 | SERVICE C | 1.2.0 | ADDITION OF FUNCTION M | |
| ... | ... | ... | ... | ... | ... | |

FIG. 3

SYSTEM CONFIGURATION INFORMATION MANAGEMENT DB (SYSTEM α DEVELOPMENT INFORMATION TABLE)

| CREATION DATE AND TIME | SERVICE NAME | VERSION |
|---|---|---|
| 2012 05-12 10:00:00 | SERVICE A | 1.0.0 |
| 2012 05-12 10:00:00 | SERVICE B | 1.0.0 |
| 2012 05-12 10:00:00 | SERVICE C | 1.0.0 |
| 2012 05-14 15:00:00 | SERVICE A | 1.1.0 |
| 2012 07-21 05:00:00 | SERVICE C | 1.1.0 |
| 2012 07-29 15:00:00 | SERVICE B | 1.1.0 |
| 2012 08-15 05:00:00 | SERVICE A | 1.2.0 |
| 2012 09-09 05:00:00 | SERVICE C | 1.2.0 |
| ⋮ | ⋮ | ⋮ |

FIG. 4

SYSTEM CONFIGURATION INFORMATION MANAGEMENT DB (API-FUNCTION CORRESPONDENCE TABLE)

| CREATION DATE AND TIME | API NAME | FUNCTION NAME | PROVIDER SERVICE |
|---|---|---|---|
| 2012 05-12 10:00:00 | API A | FUNCTION A | SERVICE A |
| 2012 05-12 10:00:00 | API B | FUNCTION B | SERVICE B |
| 2012 05-12 10:00:00 | API C | FUNCTION C | SERVICE C |
| 2012 07-29 15:00:00 | API D | FUNCTION D | SERVICE B |
| 2012 09-09 05:00:00 | API E | FUNCTION E | SERVICE C |
| ⋮ | ⋮ | ⋮ | ⋮ |

FIG. 5

SYSTEM CONFIGURATION INFORMATION MANAGEMENT DB (SYSTEM α FUNCTION RETAINING TABLE)

| CREATION DATE AND TIME | FUNCTION NAME | PROVIDER SERVICE | VERSION |
|---|---|---|---|
| 2012 05-12 10:00:00 | FUNCTION A | SERVICE A | 1.0.0 |
| 2012 05-12 10:00:00 | FUNCTION B | SERVICE B | 1.0.0 |
| 2012 05-12 10:00:00 | FUNCTION C | SERVICE C | 1.0.0 |
| 2012 05-14 15:00:00 | FUNCTION A | SERVICE A | 1.1.0 |
| 2012 07-21 05:00:00 | FUNCTION C | SERVICE C | 1.1.0 |
| 2012 07-29 15:00:00 | FUNCTION B | SERVICE B | 1.1.0 |
| 2012 07-29 15:00:00 | FUNCTION D | SERVICE B | 1.1.0 |
| 2012 08-15 05:00:00 | FUNCTION A | SERVICE A | 1.2.0 |
| 2012 09-09 05:00:00 | FUNCTION C | SERVICE C | 1.2.0 |
| 2012 09-09 05:00:00 | FUNCTION E | SERVICE C | 1.2.0 |
| ⋮ | ⋮ | ⋮ | ⋮ |

FIG. 6

CONFIGURATION SELECTION POLICY DB

| PRIORITY LEVEL | SYSTEM COVERED | CONFIGURATION SELECTION POLICY |
|---|---|---|
| 001 | ALL | EXCLUDE CONFIGURATION INCLUDING SERVICE HAVING VERSION FOR WHICH SYMPTOM OF SEVERITY LEVEL OF AA OR ABOVE IS REGISTERED IN PROBLEM AREA MANAGEMENT DB |
| 002 | ALL | EXCLUDE CONFIGURATION NOT INCLUDING FUNCTION WHOSE USE FREQUENCY FOR PAST MONTH IS IN TOP 20% |
| 003 | SYSTEM α | EXCLUDE CONFIGURATION NOT INCLUDING FUNCTION E |
| ⋮ | ⋮ | ⋮ |

FIG. 7

API EXECUTION HISTORY INFORMATION (SYSTEM α)

| START DATE AND TIME | END DATE AND TIME | API NAME | PROVIDER SERVICE NAME | VERSION |
|---|---|---|---|---|
| 2012 05-12 10:00:00 | 2012 05-13 10:00:00 | APID | SERVICE B | 1.1.0 |
| 2012 05-14 15:00:00 | 2012 07-20 15:00:00 | APIA | SERVICE C | 1.2.0 |
| 2012 07-21 05:00:00 | 2012 07-28 05:00:00 | APID | SERVICE B | 1.1.0 |
| 2012 07-29 15:00:00 | 2012 08-14 15:00:00 | APIA | SERVICE A | 1.2.0 |
| 2012 08-15 05:00:00 | 2012 09-08 05:00:00 | APIB | SERVICE B | 1.1.0 |
| 2012 09-09 05:00:00 | 2012 09-09 05:00:00 | APID | SERVICE B | 1.1.0 |
| ⋮ | ⋮ | ⋮ | ⋮ | ⋮ |

FIG. 9

FUNCTION USE FREQUENCY INFORMATION

| FUNCTION NAME | PROVIDER SERVICE | EXECUTION PERCENTAGE |
|---|---|---|
| FUNCTION A | SERVICE A | 17% |
| FUNCTION B | SERVICE B | 8% |
| FUNCTION C | SERVICE C | 13% |
| FUNCTION D | SERVICE B | 61% |
| FUNCTION E | SERVICE C | 0% |
| ⋮ | ⋮ | ⋮ |

FIG. 10

PROBLEM AREA MANAGEMENT DB (SYSTEM α)

| OCCURRENCE DATE AND TIME | OCCURRENCE SERVICE NAME | OCCURRENCE VERSION | SYMPTOM | SEVERITY RANK |
|---|---|---|---|---|
| 2012 09-27 11:04:00 | SERVICE A | 1.2.0 | SERVICE WENT DOWN | AAA |
| ⋮ | ⋮ | ⋮ | ⋮ | ⋮ |

FIG. 11

OPERATIONAL TRACK RECORD INFORMATION DB (SYSTEM α)

| CREATION DATE AND TIME | UPDATE DATE AND TIME | VERSION | OPERATIONAL TRACK RECORD |
|---|---|---|---|
| 2012 05-12 10:00:00 | 2012 05-13 10:00:00 | 1.0.0 | 43:42:31 |
| 2012 05-14 15:00:00 | 2012 07-20 15:00:00 | 1.1.0 | 128:00:12 |
| 2012 07-21 05:00:00 | 2012 07-28 05:00:00 | 1.2.0 | 51:20:29 |
| 2012 07-29 15:00:00 | 2012 08-14 15:00:00 | 1.3.0 | 48:42:31 |
| 2012 08-15 05:00:00 | 2012 09-08 05:00:00 | 1.4.0 | 21:20:29 |
| 2012 09-09 05:00:00 | 2012 09-09 05:00:00 | 1.5.0 | 10:20:29 |
| ⋮ | ⋮ | ⋮ | ⋮ |

FIG. 12

VERSION MANAGEMENT SYSTEM AND VERSION MANAGEMENT METHOD

CROSS REFERENCE TO PRIOR APPLICATIONS

This application is a U.S. National Phase application under 35 U.S.C. § 371 of International Application No. PCT/JP2016/087020, filed on Dec. 13, 2016. The content of the application is hereby incorporated by reference.

TECHNICAL FIELD

The present invention relates to a version management system and a version management method.

BACKGROUND ART

With the advent of a business field involving new technology such as the Internet of things (IoT) or FinTech, the market environment has been rapidly changing in recent years. IT business operators under such circumstances tend to speed up the process of system development and release and increase the frequency of update and the like of a target system by employing an approach such as DevOps where necessary.

As a conventional technology for maintaining availability of such a frequently updated system by handling a problem appropriately when it occurs, there has been proposed, for example, a system such as one that stabilizes operation of a system by: managing and updating information on modules linked to each application and setting an automatic module switch condition for each application; and upon occurrence of a problem or automatic switching, determining whether to switch modules according to the condition, determining the version to which the module is to be switched based on the module information, and switching the version of the module linked to the application to solve the problem of the application without affecting other applications (see PTL 1).

CITATION LIST

Patent Literature

[PTL 1] Japanese Patent Application Publication No. 2008-108155

SUMMARY OF INVENTION

Technical Problem

In conventional system development, it is often the case that a target system is updated approximately twice a year at long intervals. For this reason, when a problem occurs, the problem is solved, and a system can be continued to operate by restoring applications and middleware constituting the system to the past states (versions) with successful operational track records. For instance, if an application constituting a certain system has a version A experiencing an operation for 90 days in the past and a version B experiencing an operation for 30 days in the past, the version A is selected as a restoration candidate.

However, it is problematic when such a conventional approach is applied to an environment which employs the aforementioned DevOps or the like to speed up development and release and update a target system ten times or more a day. Specifically, even if a restoration candidate is selected and applied based on the past operational track records, the candidate may no longer be able to provide a necessary function in the system to which the candidate is applied. In other words, there may be a fallback in functions that the system can provide.

Therefore, the present invention aims to provide a technology capable of providing a reliable system configuration for a system by allowing the system to provide functions at a minimum fallback rate even when the system is restored due to occurrence of a problem.

Solution to Problem

To solve the above problem, a version management system of the present invention comprises a storage device that retains information on version histories of services each providing a predetermined function in a predetermined system; and an arithmetic device that executes processing of generating, based on the information on the version histories, a list of combination patterns of versions of the respective services as system configurations of the system, processing of excluding, from the patterns in the list, the pattern whose function fallback rate is equal to or above a predetermined level, the function fallback rate being based on predefined necessary functions, and processing of identifying, in the patterns remaining in the list after the exclusion, the pattern whose similarity to a system configuration having a predetermined past operational track record is equal to or above a predetermined level, as a system configuration to which the system is to be restored upon occurrence of a problem.

Further, a version management method of the present invention implemented by an information processing system including a storage device that retains information on version histories of services each providing a predetermined function in a predetermined system comprises generating, based on the information on the version histories, a list of combination patterns of versions of the respective services as system configurations of the system; excluding, from the patterns in the list, the pattern whose function fallback rate is equal to or above a predetermined level, the function fallback rate being based on predefined necessary functions; and identifying, in the patterns remaining in the list after the exclusion, the pattern whose similarity to a system configuration having a predetermined past operational track record is equal to or above a predetermined level, as a system configuration to which the system is to be restored upon occurrence of a problem.

Advantageous Effects of Invention

The present invention can provide a reliable system configuration for a system by allowing the system to provide functions at a minimized fallback rate even when the system is restored due to occurrence of a problem.

BRIEF DESCRIPTION OF DRAWINGS

FIG. 3 is a diagram illustrating a first example of a system configuration information management DB according to the present embodiment.

FIG. 4 is a diagram illustrating a second example of the system configuration information management DB according to the present embodiment.

FIG. 5 is a diagram illustrating a third example of the system configuration information management DB according to the present embodiment.

FIG. 6 is a diagram illustrating a fourth example of the system configuration information management DB according to the present embodiment.

FIG. 7 is a diagram illustrating an example of configuration selection policies according to the present embodiment.

FIG. 9 is a diagram illustrating a first example of a function use frequency information DB according to the present embodiment.

FIG. 10 is a diagram illustrating a second example of the function use frequency information DB according to the present embodiment.

FIG. 11 is a diagram illustrating an example of a problem area management DB according to the present embodiment.

FIG. 12 is a diagram illustrating an example of an operational track record information DB according to the present embodiment.

DESCRIPTION OF EMBODIMENTS (Network Configuration)

Figure 1:
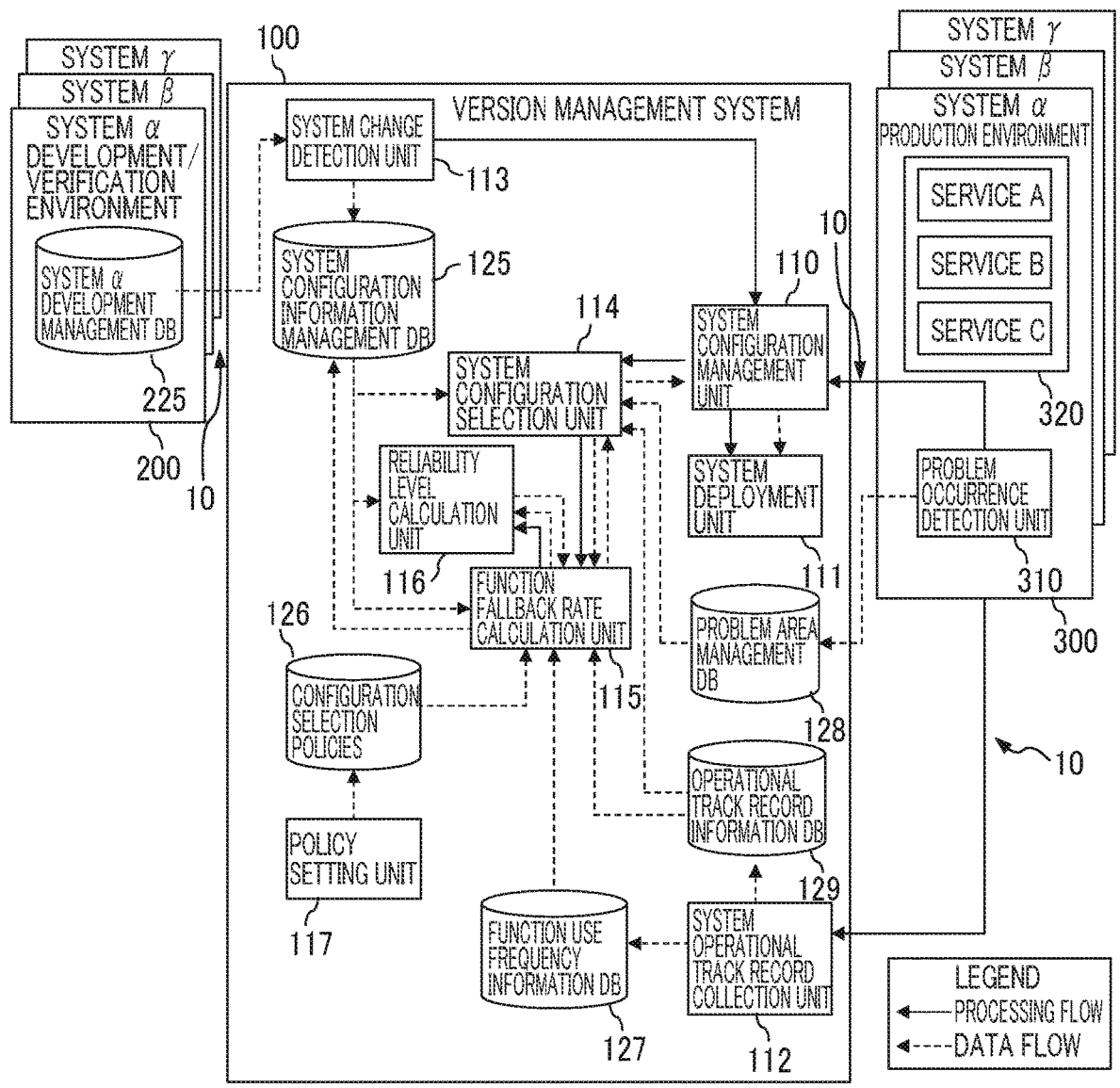
FIG. 1 is a diagram illustrating an example configuration of a network including a version management system of the present embodiment.

Using the drawings, a detailed description is given below of an embodiment of the present invention. FIG. 1 is a diagram illustrating an example configuration of a network including a version management system 100 of the present embodiment. The version management system 100 illustrated in FIG. 1 is a computer system that can provide a reliable system configuration for a system targeted for development or release by allowing the system to provide functions at a minimized fallback rate even the system is restored due to occurrence of a problem.

The version management system 100 may be configured as a server device coupled to a development environment 200 and a production environment 300 via a network 10 in a manner capable of data communication. It goes without saying that at least one of the development environment 200 and the production environment 300 may be integral with the version management system 100.

The version management system 100 exemplified in FIG. 1 implements functions including a system configuration management unit 110, a system deployment unit 111, a system operational track record collection unit 112, a system change detection unit 113, a system configuration selection unit 114, a function fallback rate calculation unit 115, a reliability level calculation unit 116, and a policy setting unit 117.

The version management system 100 retains sets of data including a system configuration information management DB 125, configuration selection policies 126, a function use frequency information DB 127, a problem area management DB 128, an operational track record information DB 129, and service combination candidates 130.

Details of the above functions and sets of data and their relations with one another will be given later in concrete terms.

The development environment 200 exists for each of development target systems α to γ. The development environment 200 is a server device in which an existing system development tool is implemented, and is accessed by a predetermined terminal of a developer and the like. Results of development operations performed by the developer and the like using the system operation tool, i.e., information on development contents, are stored in a system development management DB 225.

The production environment 300 is an environment where the system developed by the development environment 200 is deployed and actually released. The production environment 300 is, for example, a business system used by a business operator. In FIG. 1, the production environment 300 where the "system α" is deployed is illustrated as an example. The system configuration of the "system α" includes a "service A", a "service B", and a "service C". These services provide predetermined functions.

Further, the production environment 300 includes a problem occurrence detection unit 310. The problem occurrence detection unit 310 detects when a problem such as a failure occurs in the system (one of the systems α to γ) released in the production environment 300, and notifies the version management system 100. The problem occurrence detection unit 310 is implemented by an appropriate use of an existing failure occurrence detection tool.

(Hardware Configuration)

Figure 2:
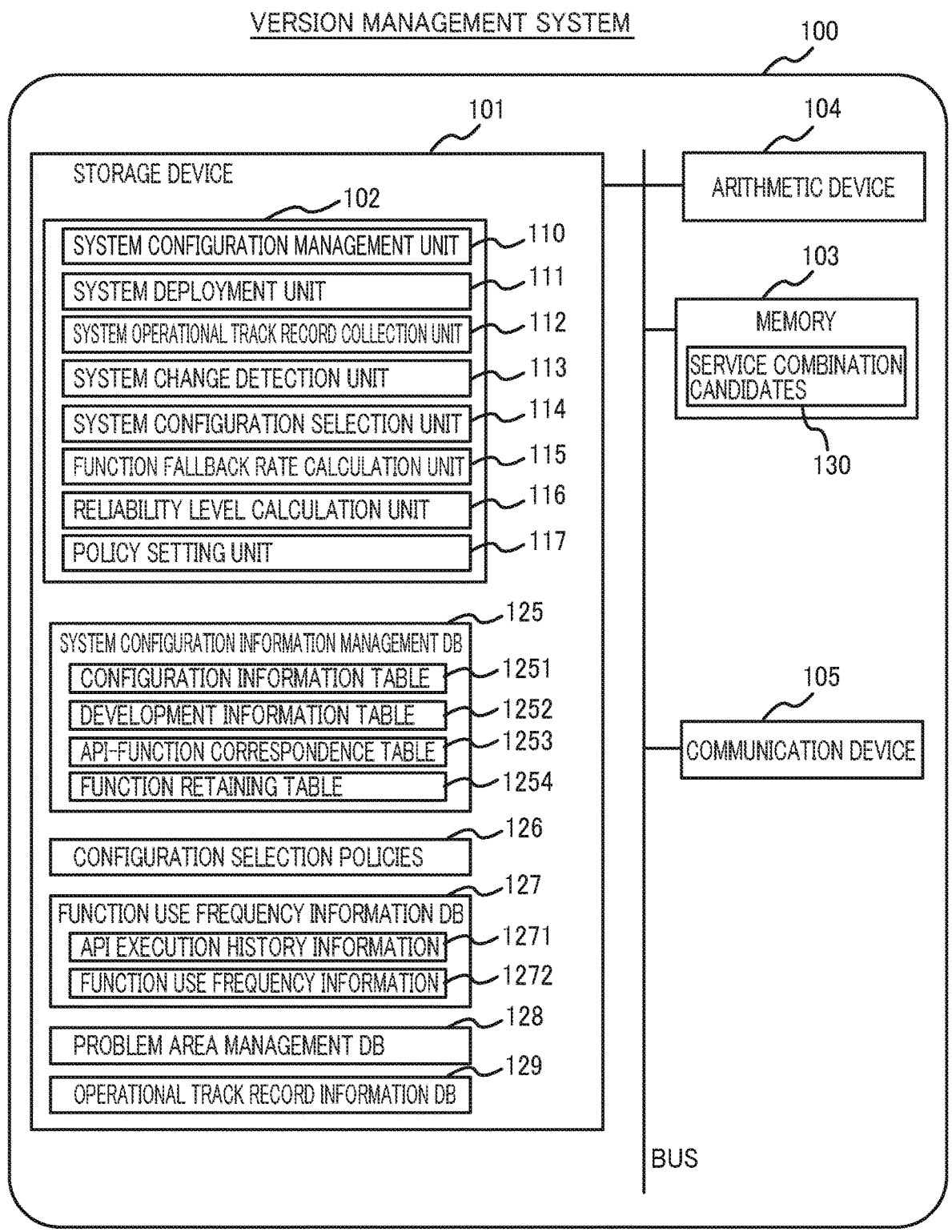
FIG. 2 is a diagram illustrating a hardware configuration of the version management system of the present embodiment.

FIG. 2 exemplifies the hardware configuration of the version management system 100. The version management system 100 of the present embodiment includes a storage device 101 formed by an appropriate non-volatile storage element such as a hard disk drive, a memory 103 formed by a volatile storage element such as a RAM, a CPU (an arithmetic device) that, for example, loads programs 102 stored in the storage device 101 into the memory 103 and executes the programs 102 to perform overall control of the system and to perform various types of determination and computation and control processing, and a communication device 105 that is coupled to the network 10 and performs processing to communicate with another device.

Note that the storage device 101 stores not only the programs 102 for implementing the functions 110 to 117 of the version management system of the present embodiment, but also at least the system configuration information management DB 125 (including a configuration information table 1251, a development information table 1252, an API-function correspondence table 1253, and a function retaining table 1254), the configuration selection policies 126, the function use frequency information DB 127 (including an API execution history information 1271, and a function use frequency information 1272), the problem area management DB 128, and the operational track record information DB 129. In addition, in the memory 103, the service combination candidates 130 are stored as a result of predetermined processing. Details of these functions 110 to 117 and data structures will be given later.

(Examples of Data Structures)

Next, a description is given of the databases used by the version management system 100 of the present embodiment.

FIG. 3 illustrates an example of the configuration information table 1251, which is an example of the tables included in the system configuration information management DB 125 of the present embodiment. The configuration information table 1251 is a table storing information on the system configuration of the "system α".

Its data structure is an aggregate of records each formed by data such as creation date and time 1500 as a primary key, deletion date and time 1501, update date and time 1502, service name 1503, version 1504, and update history 1505. As exemplified herein, a system targeted for development or release is formed by a plurality of services each being able to provide a certain function. The version of each of these services is managed every time update is done.

FIG. 4 illustrates an example of the development information table 1252, which is an example of the tables included in the system configuration information management DB 125 of the present embodiment. The development information table 1252 is a table storing development histories of respective services constituting the "system α".

Its data structure is an aggregate of records each formed by data such as creation date and time 1600 as a primary key, service name 1601, and its version 1602. The example illustrated in FIG. 4 shows that, as to the "service A" for instance, after version "1.0.0" is created at "2012/5/12 10:00:00", the "service A" is updated to the version "1.1.0" at "2012/5/14 15:00:00", and updated to the version "1.2.0" at "2012/8/15 05:00:00".

FIG. 5 illustrates an example of the API-function correspondence table 1253, which is an example of the tables included in the system configuration information management DB 125 of the present embodiment. The API-function correspondence table 1253 is a table defining the correspondences among an API that the system (such as the system α) provides to the outside, a function corresponding to the API, and a service that provides the function.

Its data structure is an aggregate of records each formed by data such as creation date and time 1800 as a primary key, API name 1801, function name 1802, and provider service 1803.

FIG. 6 illustrates an example of the function retaining table 1254, which is an example of the tables included in the system configuration information management DB 125 of the present embodiment. The function retaining table 1254 is a table storing update histories of the functions provided by the "system α".

Its data structure is an aggregate of records each formed by data such as creation date and time 2000 as a primary key, function name 2001, provider service 2002, and its version 2003. The example illustrated in FIG. 6 shows that the "function A", for instance, is provided by the "service A", and after the version "1.0.0" is created at "2012/5/12 10:00:00", the "function A" is updated to the version "1.1.0" at "2012/5/14 15:00:00" and updated to the version "1.2.0" at "2012/8/15 05:00:00".

FIG. 7 illustrates an example of the configuration selection policies 126 according to the present embodiment. The configuration selection policies 126 is a table storing a system configuration to be deployed in the production environment 300 of a corresponding system in the event of a system failure or the like, or in other words, the contents of the system configuration the developer and the like want the system to restore to in the event of a system failure or the like.

Figure 8:
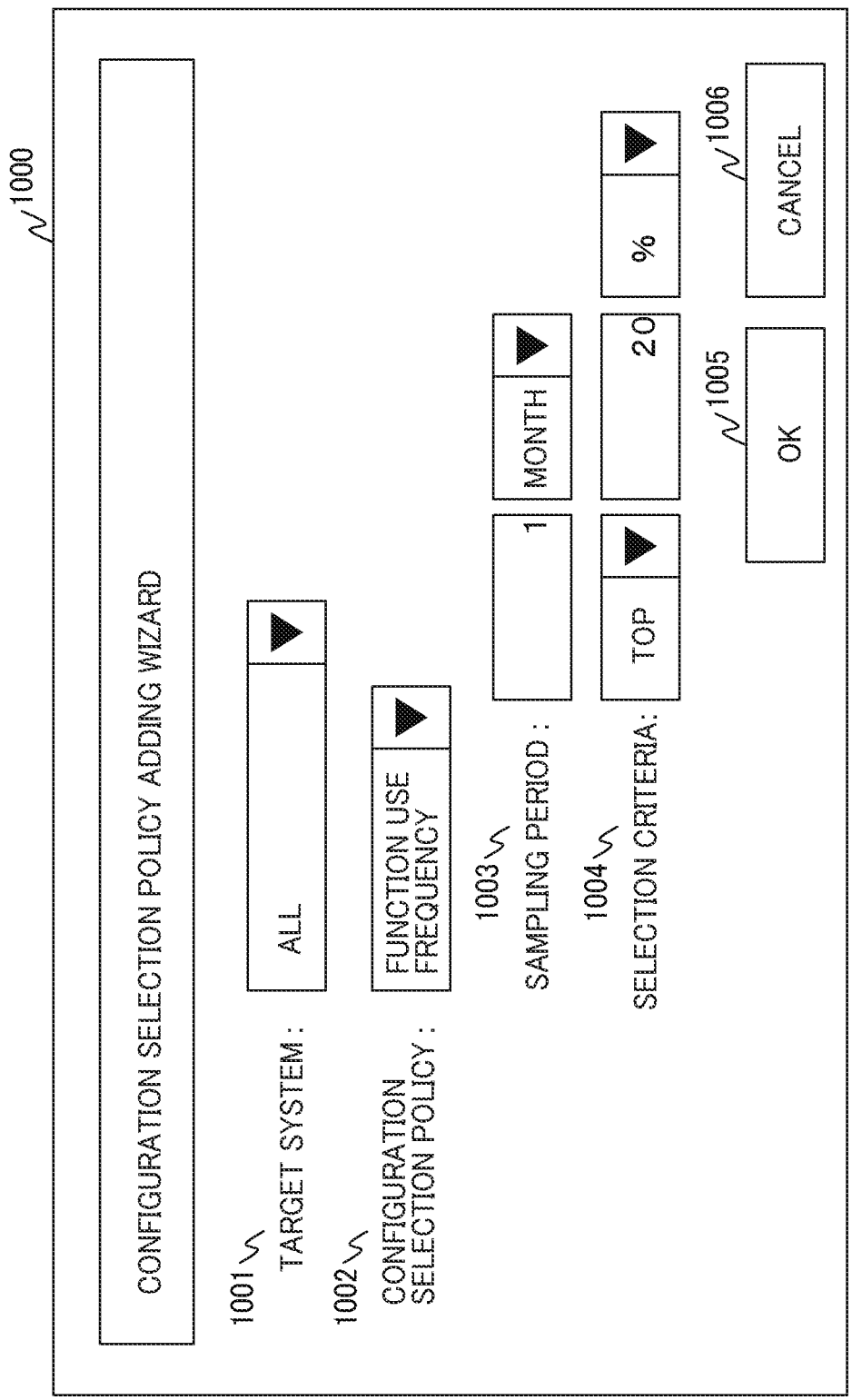
FIG. 8 is a diagram illustrating an example of a monitor display according to the present embodiment.

Its data structure is an aggregate of records each formed by data such as priority level 1100 as a primary key, system covered 1101, and configuration selection policy 1102. FIG. 8 illustrates an example of a monitor display 1000 for receiving values to set in the configuration selection policies 126 from the developer's terminal or the like.

This monitor display 1000 is a monitor display used by the developer to set information concerning the priority level "002" in the configuration selection policies 126 in FIG. 7. In the monitor display 1000, a target system 1001 which is an interface for receiving a value to set to the system covered 1101, configuration selection policy 1002 which is an interface for receiving a value to set to the configuration selection policy 1102, sampling period 1003, and selection criteria 1004 are displayed. The developer inputs necessary pieces of information on this monitor display 1000 and presses OK button 1005 to notify the version management system 100 of the input information. When cancel button 1006 is pressed, the input information is cleared, and no notification is given to the version management system 100.

FIG. 9 illustrates an example of the API execution history information 1271, which is an example of the tables included in the function use frequency information DB 127 of the present embodiment. The API execution history information 1271 is a table storing histories of API executions in the "system α".

Its data structure is an aggregate of records each formed by data such as start date and time 1300 as a primary key, end date and time 1301, API name 1302, provider service name 1303, and version 1304.

FIG. 10 illustrates an example of the function use frequency information 1272, which is an example of the tables included in the function use frequency information DB 127 of the present embodiment. The function use frequency information 1272 is a table storing information on the percentage at which each function is used in the "system α" within a given period of time.

Its data structure is an aggregate of records each formed by data such as function name 1900 as a primary key, provider service 1901, and execution percentage 1902.

FIG. 11 illustrates an example of the problem area management DB 128 of the present embodiment. This problem area management DB 128 is a database storing information on a problem that occurred, which is notified of by the problem occurrence detection unit 310 of the production environment 300 regarding the "system α".

Its data structure is an aggregate of records each formed by data such as occurrence date and time 1400 as a primary key, occurrence service name 1401, occurrence version 1402, symptom 1403, and severity rank 1404.

FIG. 12 illustrates an example of the operational track record information DB 129 of the present embodiment. The operational track record information DB 129 is a database storing operational track records for the respective versions of the "system α" (the versions in this case are the versions of the "system α").

Its data structure is an aggregate of records each formed by data such as creation date and time 1200 as a primary key, update date and time 1201, version 1202, and operational track record 1203.

(Flow Example 1)

Hereinafter, actual procedures of a version management method according to the present embodiment are described based on the drawings. Various operations in the version management method described below are implemented by programs that the version management system 100 loads into the memory 103 and executes. These programs are formed by codes for executing the various operations described below.

Figure 13:
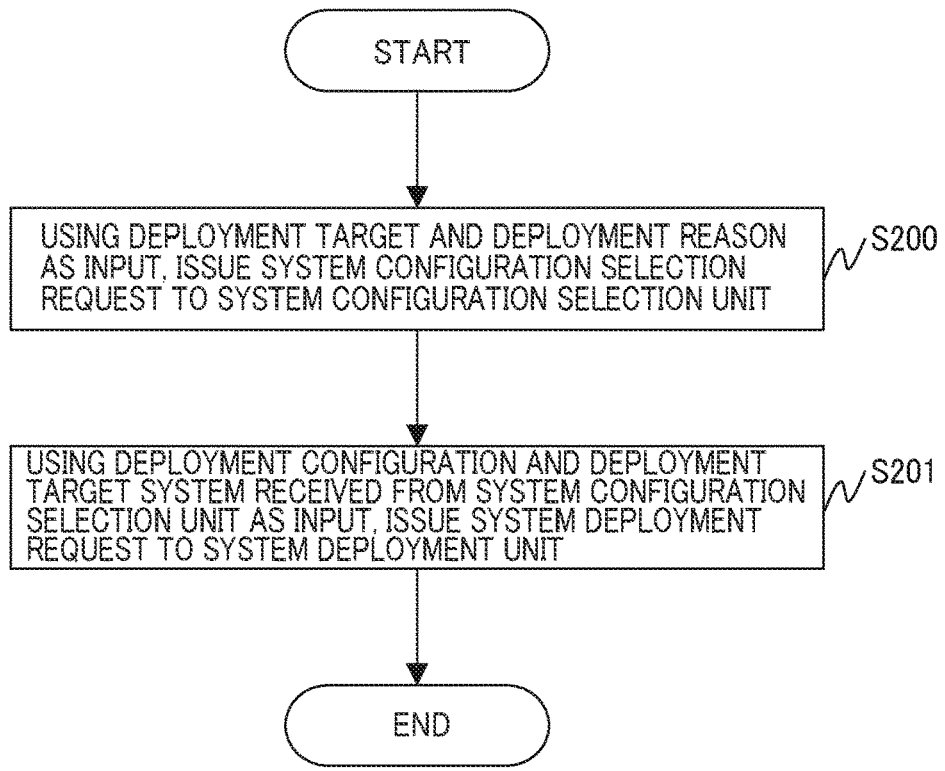
FIG. 13 is a diagram illustrating flow example 1 according to the present embodiment.

FIG. 13 is a diagram illustrating the flow example 1 of the version management method according to the present embodiment. In this first example, a general deployment procedure performed independent of whether a problem occurs is described.

For example, the system configuration management unit 110 of the version management system 100 receives a deployment target system (e.g., the system α) and the reason for the deployment from the development environment 200 or a developer's given terminal, and using these as an input, issues a system configuration selection request to the system configuration selection unit 114 (S200).

Then, using a deployment configuration and a deployment target system (e.g., the system α in the production environment 300) received from the system configuration selection unit 114 as an input, the system configuration management unit 110 issues a system deployment request to the system deployment unit 111 (S201).

Each of the processes described above conforms to a general deployment procedure, and is not described in detail here.
(Flow Example 2)

Figure 14:
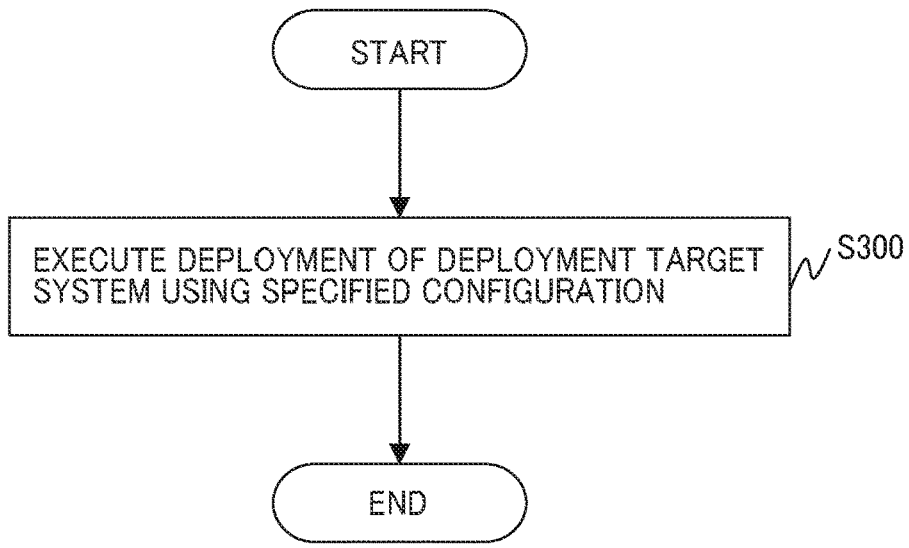
FIG. 14 is a diagram illustrating flow example 2 according to the present embodiment.

Next, a description is given of processing performed by the system deployment unit 111 after the system deployment request is issued thereto in the above-described the flow example 1. FIG. 14 is a diagram illustrating the flow example 2 of the version management method according to the present embodiment.

Upon receipt of the system deployment request, the system deployment unit 111 deploys the deployment target system using the configuration specified in the system deployment request (S300), and the processing ends.
(Flow Example 3)

Figure 15:
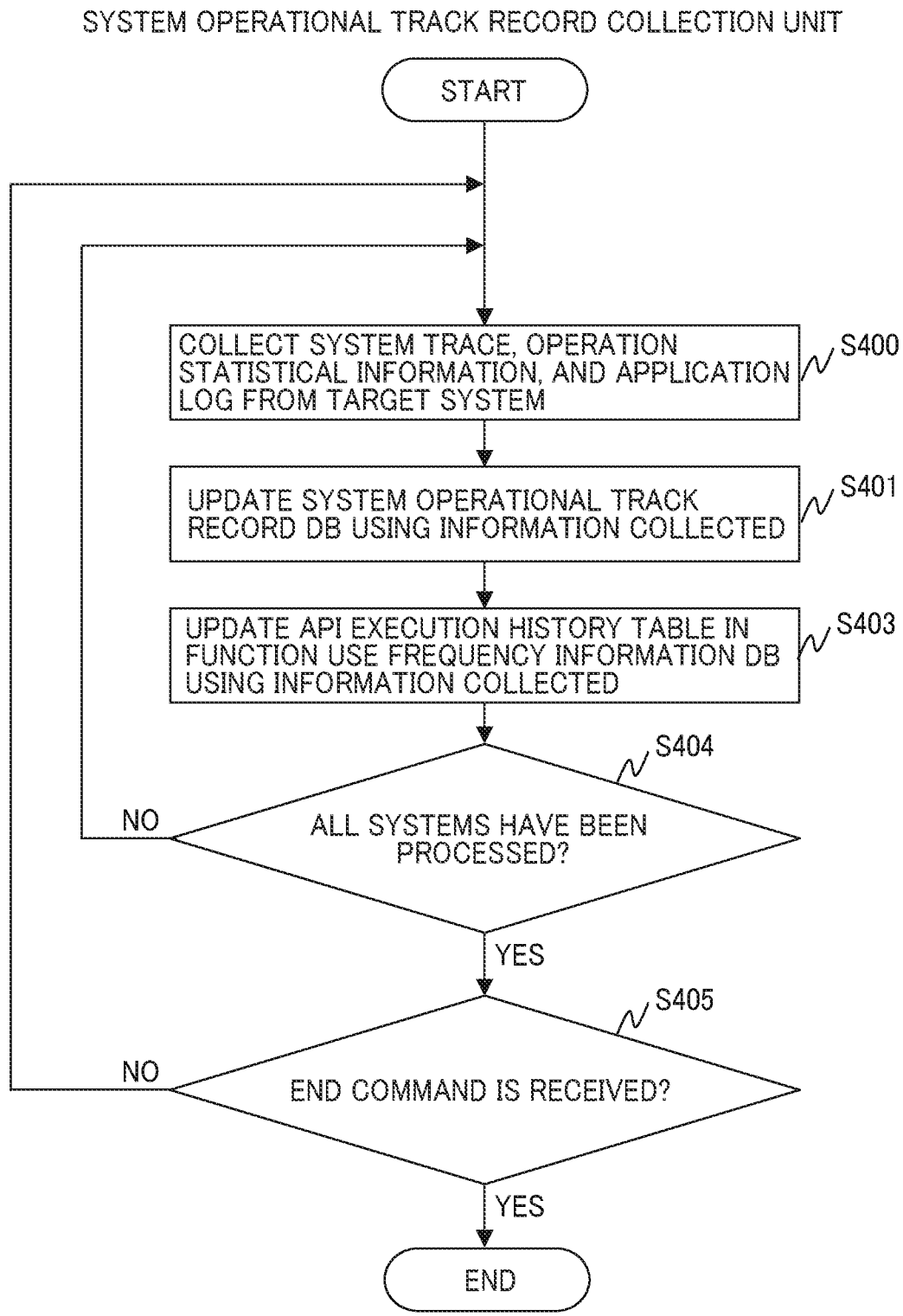
FIG. 15 is a diagram illustrating flow example 3 according to the present embodiment.

A description is given of processing to collect and manage an operational track record of a system deployed in the production environment 300 like in the above-described the flow example 2. FIG. 15 is a diagram illustrating the flow example 3 of the version management method according to the present embodiment. Note that in the example herein, CPU operating time and API execution histories in the target system are assumed as the operational track records.

The system operational track record collection unit 112 of the version management system 100 collects a system trace, operation statistical information, an application log, and the like from the target system (e.g., the system α) in the production environment 300 (S400). The collecting of the logs and the like may be achieved using an appropriate conventional technology such as one in which the system operational track record collection unit 112 collects the information by sending a log acquisition request to the corresponding production environment 300 or one in which the system operational track record collection unit 112 acquires information updated periodically by an operation monitoring robot in the production environment 300.

Then, using the information collected in S400, the system operational track record collection unit 112 updates the operational track record information DB 129 (S401). Specific processing is as follows: using the version of the target system indicated by the collected information as a primary key, the system operational track record collection unit 112 identifies a record having that version in the operational track record information DB 129 and adds an operating time indicated by the collected information to the value of the operational track record 1203 for the identified record.

Next, using the information collected in S400, the system operational track record collection unit 112 updates the API execution history information 1271 in the function use frequency information DB 127 (S403).

Then, the system operational track record collection unit 112 determines whether the processing from S400 to S403 described above has been performed for all the systems in the production environment 300 (S404).

If, on the one hand, it is determined that the processing has not been performed for every system (S404: NO), the system operational track record collection unit 112 proceeds back to S400.

If, on the other hand, it is determined that the processing has been performed for every system (S404: YES), the system operational track record collection unit 112 determines whether, for example, it has received an end command from an appropriate function such as the system configuration management unit 110 (S405).

If, on the one hand, it is determined that no end command is received (S405: NO), the system operational track record collection unit 112 proceeds back to S400.

If, on the other hand, it is determined that an end command is received (S405: YES), the system operational track record collection unit 112 ends the processing.
(Flow Example 4)

Figure 16:
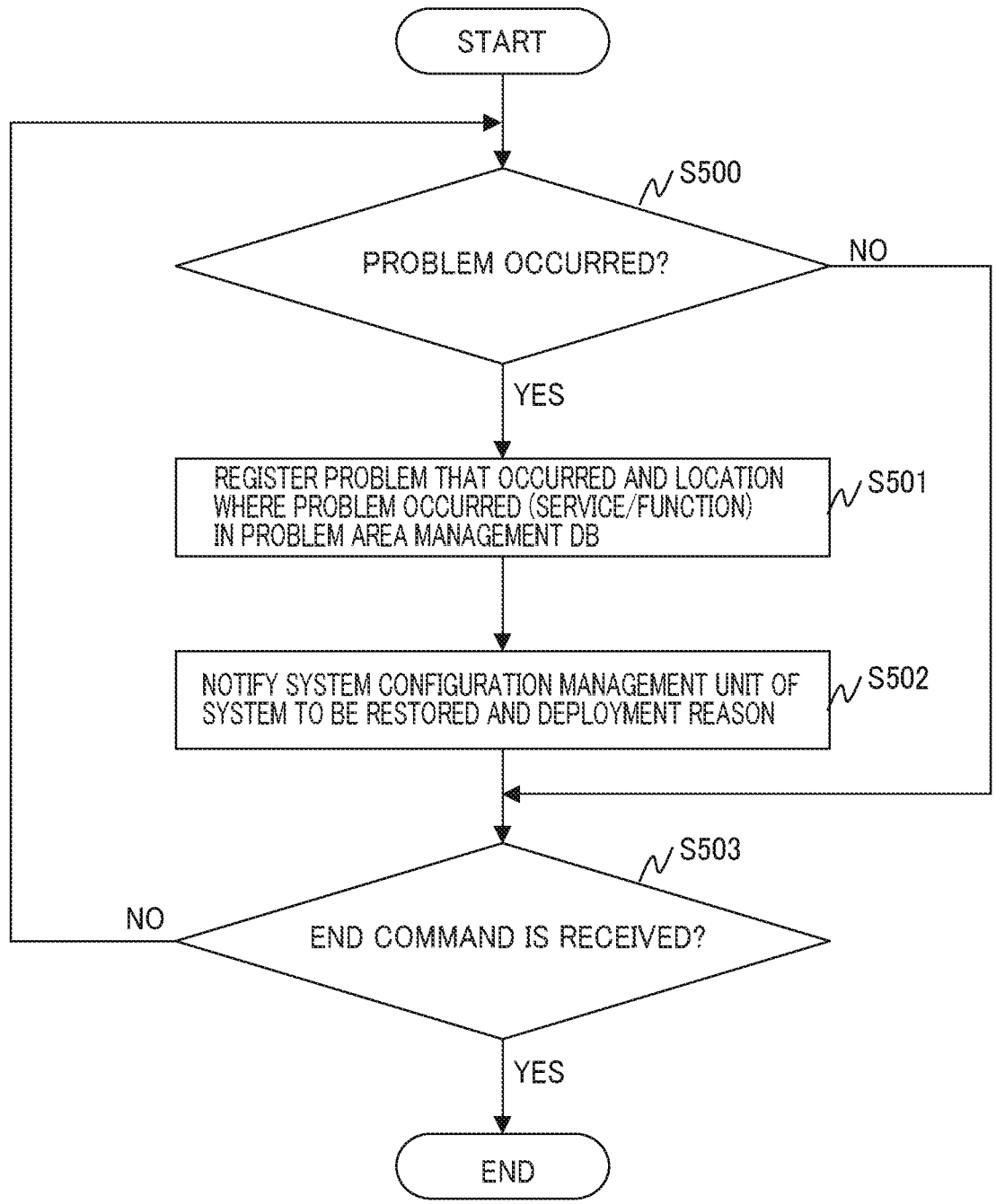
FIG. 16 is a diagram illustrating flow example 4 according to the present embodiment.

Next, a description is given of processing performed when a problem such as a failure occurs in a system deployed in the production environment 300 as described above. FIG. 16 is a diagram illustrating the flow example 4 of the version management method according to the present embodiment.

In this processing, the problem occurrence detection unit 310 of the production environment 300 monitors processes and syslog messages to determine whether occurrence of a problem such as a failure is detected in any of the systems (the systems α to γ) (S500).

If, on the one hand, it is determined that no problem is occurring (S500: NO), the problem occurrence detection unit 310 proceeds to S503.

If, on the other hand, it is determined that a problem is occurring in, for instance, the "system α" (S500: YES), the problem occurrence detection unit 310 identifies the location and cause of the problem occurring based on a message outputted from the target system and on a symptom caused, and registers in the problem area management DB 128 information such as the problem occurring, the location of the problem occurring (service/function), date and time of the occurrence, the symptom caused, and severity rank (S501).

Next, the problem occurrence detection unit 310 notifies the system configuration management unit 110 of the system to be restored (e.g., the system α) and the reason of deployment (e.g., problem tackling) (S502).

Also, the problem occurrence detection unit 310 determines whether an end command is received (S503).

If, on the one hand, it is determined that no end command is received (S503: NO), the problem occurrence detection unit 310 proceeds back to S500.

If, on the other hand, it is determined that an end command is received (S503: YES), the problem occurrence detection unit 310 ends the processing.
(Flow Example 5)

Figure 17:
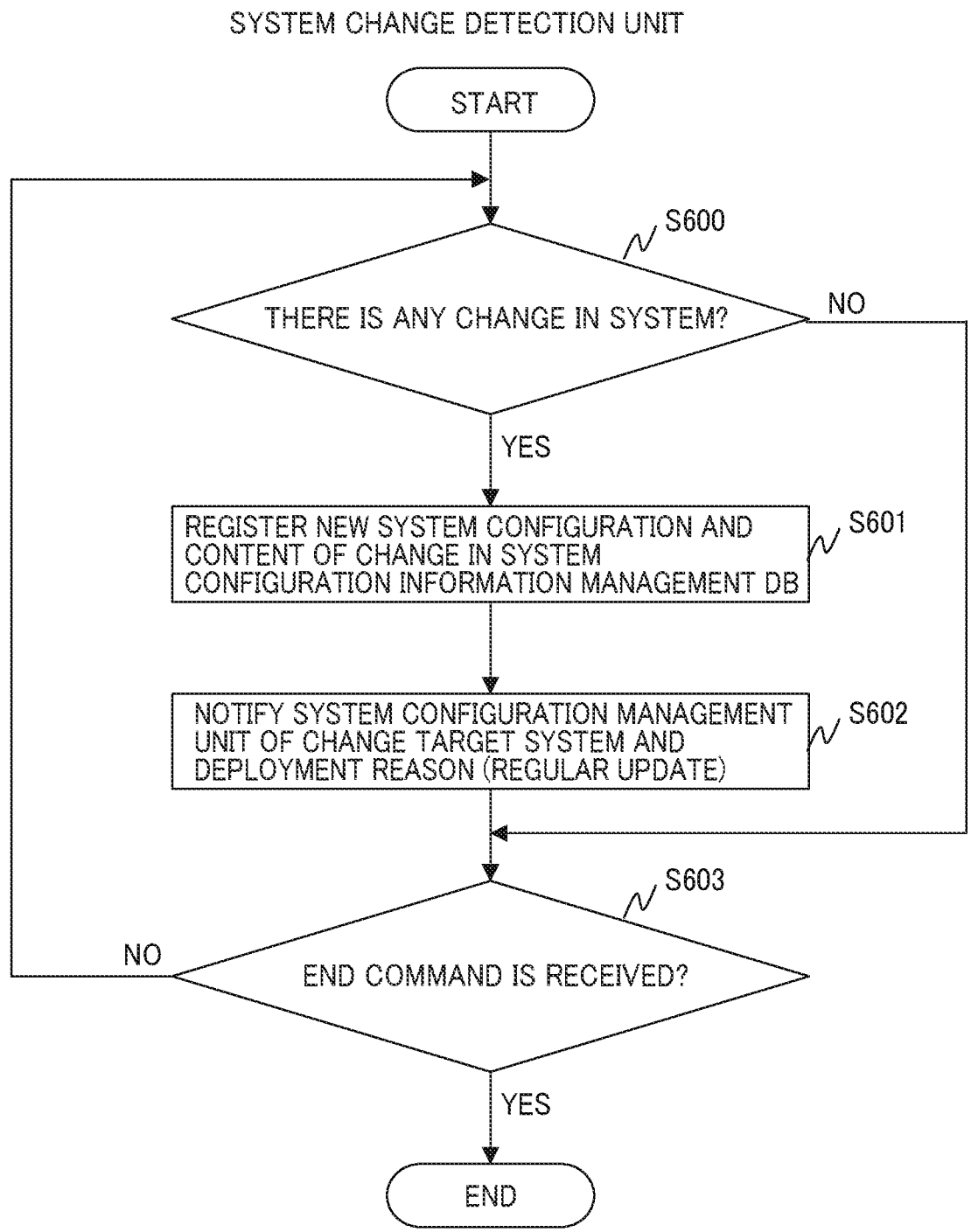
FIG. 17 is a diagram illustrating flow example 5 according to the present embodiment.

Next, a description is given of processing performed after a developer and the like performs system update independently of occurrence of a problem. FIG. 17 is a diagram illustrating the flow example 5 of the version management method according to the present embodiment.

In this processing, the system change detection unit 113 of the version management system 100 determines whether there is any change in the development target system (S600). A conceivable way to determine this is to check whether a notification to update the development management DB225 is received from the development environment 200.

If, on the one hand, it is determined that there is no change (S600: NO), the system change detection unit 113 proceeds to S603.

If, on the other hand, it is determined that there is any change (S600: YES), the system change detection unit 113 acquires the content of the update in the development management DB225 from the development environment 200, and registers a new updated system configuration and the content of the change in the system configuration information management DB 125 (S601).

Next, the system change detection unit 113 notifies the system configuration management unit 110 of the change target system and the reason for deployment (e.g., regular update) (S602).

Further, the system change detection unit 113 determines whether an end command is received (S603).

If, on the one hand, it is determined that no end command is received (S603: NO), the system change detection unit 113 proceeds back to S600.

If, on the other hand, it is determined that an end command is received (S603: YES), the system change detection unit 113 ends the processing.

(Flow Example 6)

Figure 18:
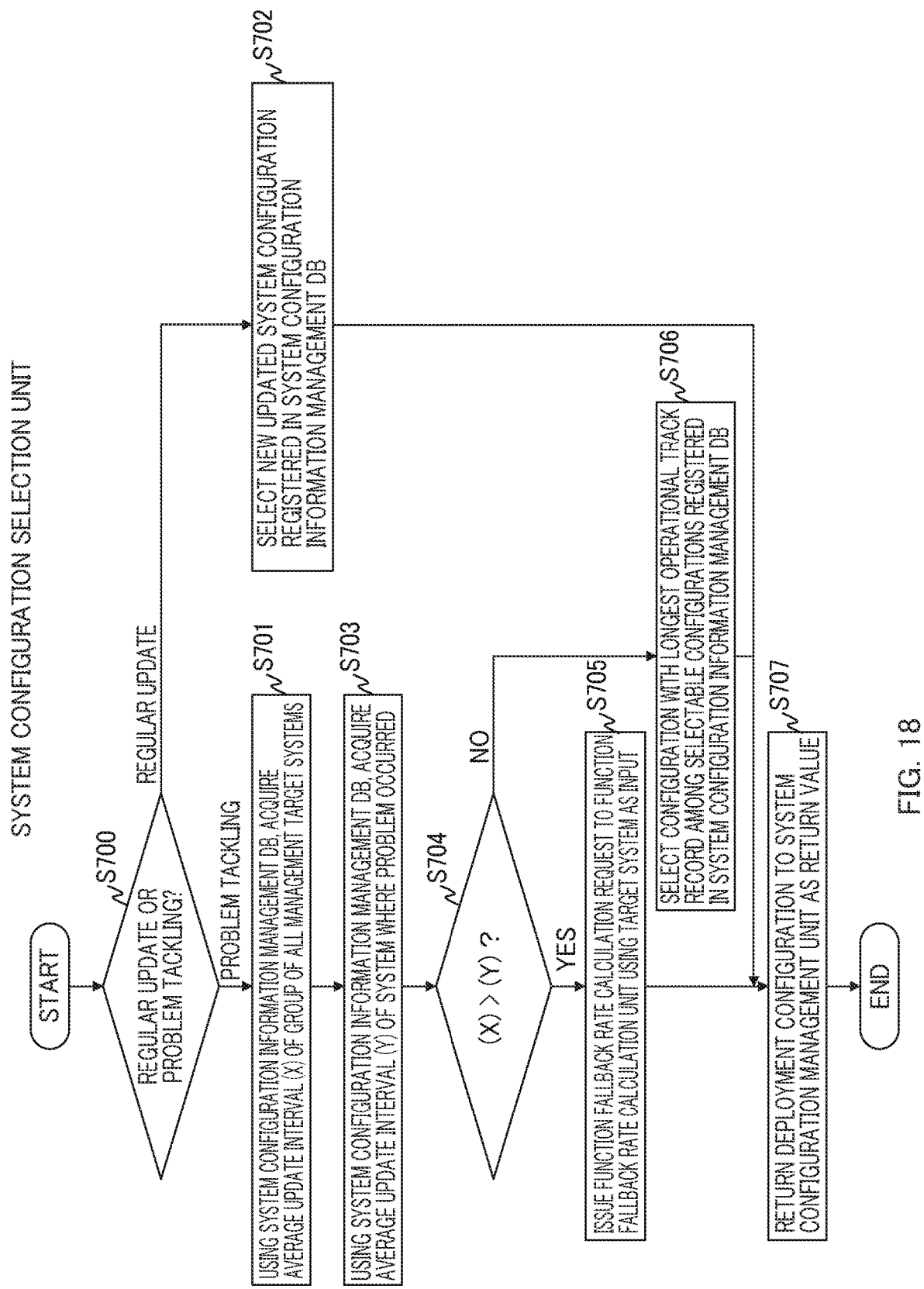
FIG. 18 is a diagram illustrating flow example 6 according to the present embodiment.

Next, a description is given of processing to identify a newly generated system configuration to which a deployment target system in the production environment 300 (e.g., the system α) is to be restored due to occurrence of a problem such as a failure. FIG. 18 is a diagram illustrating the flow example 6 of the version management method according to the present embodiment.

In this processing, upon receipt of either the notification in S502 of the flow example 4 (FIG. 16) described above or the notification in S602 of the flow example 5 (FIG. 17) described above, the system configuration selection unit 114 determines whether the notification thus received indicates regular update or problem tackling (S700).

If, on the one hand, it is determined that the notification indicates a "regular update", i.e., the notification has been issued not due to occurrence of a problem (S700: regular update), the system configuration selection unit 114 selects a new updated system configuration registered in the system configuration information management DB 125 (S702), and proceeds to S707.

If, on the other hand, the notification indicates a "problem tackling", i.e., the notification has been issued due to occurrence of a problem (S700: problem tackling), the system configuration selection unit 114 calculates the average update interval (X) of all the management target systems, namely the "system α" to the "system γ", based on their configuration information tables 1251 in the system configuration information management DB 125 (S701).

Specifically, the system configuration selection unit 114 calculates the average update interval of each management target system within a predetermined period of time (e.g., the past month) by determining, in the configuration information table 1251 for the management target system, the number of records whose values under the creation date and time 1500 fall within the predetermined period of time (e.g., 10), and dividing the predetermined period of time by the number of records (e.g., 30 days÷10=3 days). After thus calculating the average update intervals of the respective management target systems (such as β=10 days and γ=5 days), the system configuration selection unit 114 calculates the average update interval of all the management target systems (e.g., (3+10+5)/3=6 days).

Next, the system configuration selection unit 114 calculates the average update interval (Y) of the problem-occurring system (e.g., the system α) based on the configuration information table 1251 in the system configuration information management DB 125 (S703). Specifically, the system configuration selection unit 114 calculates the average update interval of the management target system, the system α, within a predetermined period of time (e.g., the past month) by determining, in the configuration information table 1251 for the system α, the number of records whose values under the creation date and time 1500 fall within the predetermined period of time (e.g., 10), and dividing the predetermined period of time by the number of records (e.g., 30 days÷10=3 days).

Next, the system configuration selection unit 114 compares the average update interval (X) calculated in S701 above with the average update interval (Y) calculated in S703 above, and determines whether the relation (X)>(Y) holds true (S704).

If, on the one hand, it is determined that (X)>(Y) does not hold true (S704: NO), or in other words, if the update interval of the "system α" to be deployed is equal to or longer than that of the other systems, the system configuration selection unit 114 determines that the "system α" to be deployed is a system whose update frequency is conventional, selects a version on a record whose operational track record 1203 shows the largest value in the operational track record information DB 129 of the corresponding system (S706), and proceeds to S707.

If, on the other hand, it is determined that (X)>(Y) holds true (S704: YES), or in other words, if the update interval of the "system α" to be deployed is shorter than that of the other systems, the system configuration selection unit 114 determines that the "system α" to be deployed is of a DevOps-type whose update frequency is unconventional, and issues a function fallback rate calculation request to the function fallback rate calculation unit 115 using the target system as an input (S705).

Next, the system configuration selection unit 114 returns a deployment configuration as a return value to the system configuration management unit 110 (S707), and ends the processing. The deployment configuration returned here is the system configuration (the system configuration to which the system is to be restored) generated by the function fallback rate calculation unit 115 in response to the function fallback rate calculation request issued in S705 above.

(Flow Example 7)

Figure 19:
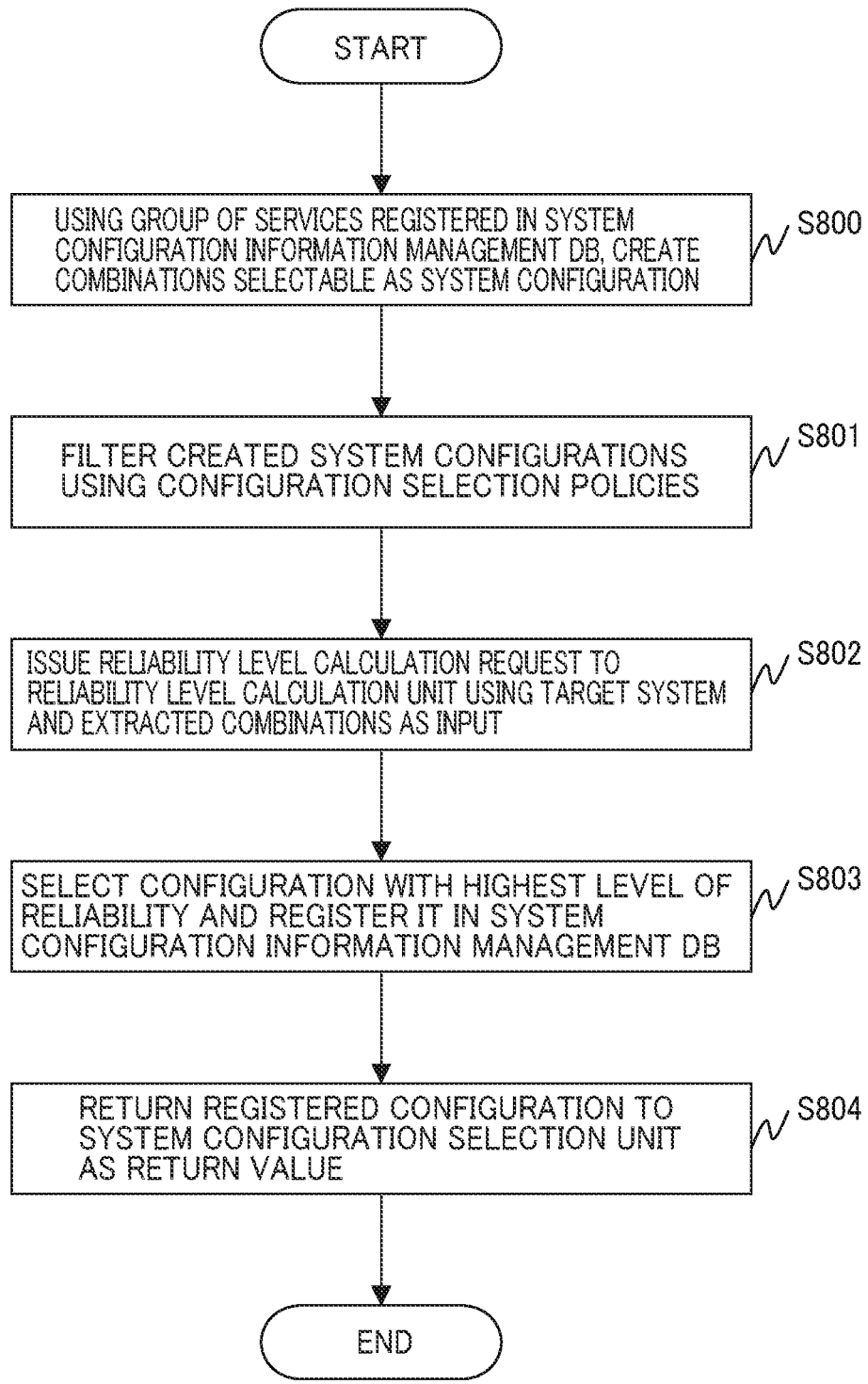
FIG. 19 is a diagram illustrating flow example 7 according to the present embodiment.
Figure 20:
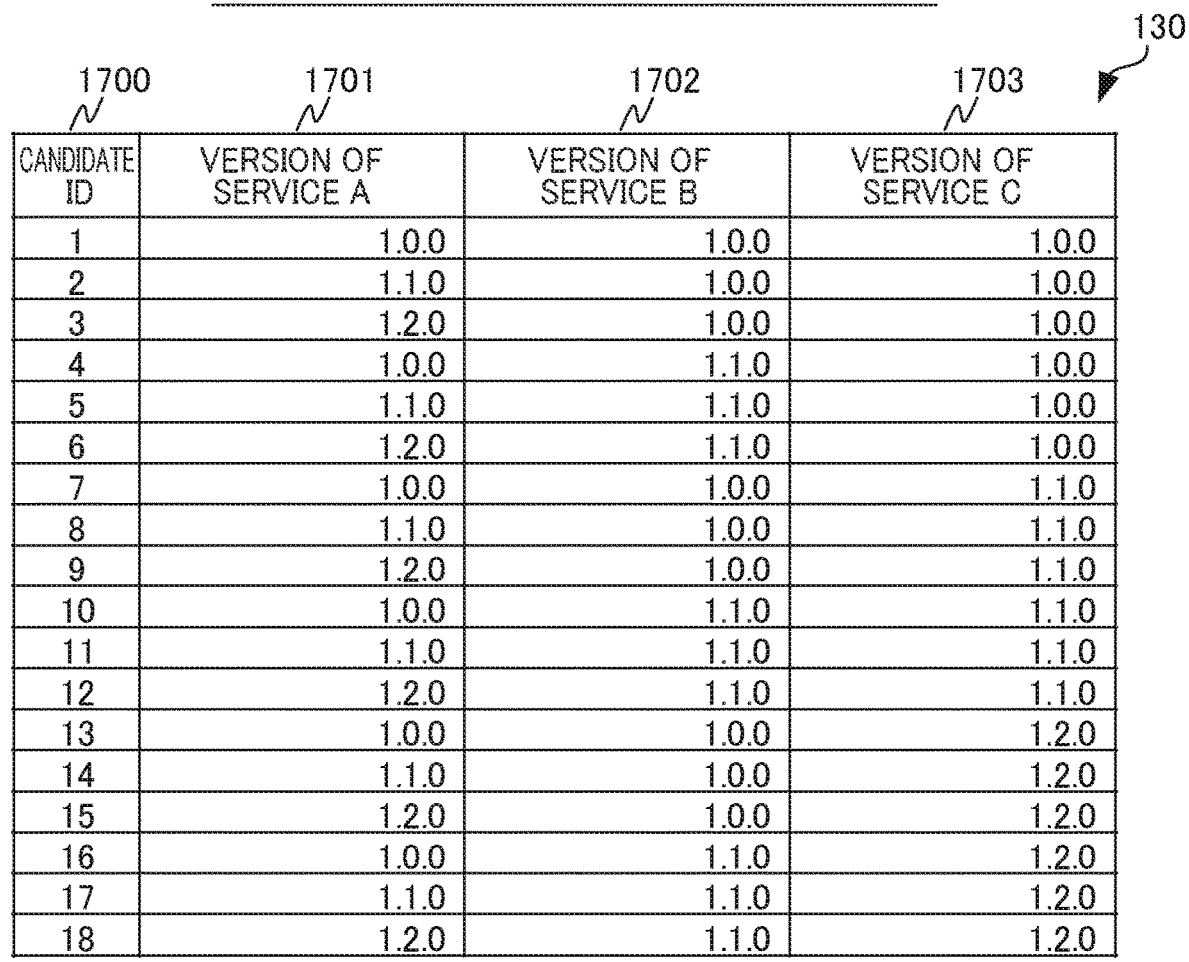
FIG. 20 is a diagram illustrating an example of service combination candidates according to the present embodiment.

Next, a description is given of processing to generate a system configuration to which a deployment target system is to be restored upon occurrence of a problem. FIG. 19 is a diagram illustrating the flow example 7 of the version management method according to the present embodiment.

In this processing, based on the configuration information table 1251 (FIG. 3) and the development information table 1252 (FIG. 4), the function fallback rate calculation unit 115 of the version management system 100 acquires information on the services constituting the "system α" to be deployed and version histories of the services, and generates, on the memory 103, the service combination candidates 130 (FIG.

20), which is a table showing combinations of the versions of the services selectable as a system configuration of the "system α" (S800).

Further, in conformity with the configuration selection policy 1102 in the configuration selection policies 126 (FIG. 7), the function fallback rate calculation unit 115 filters the records in the service combination candidates 130 (S801).

The filtering is executed in conformity with the configuration selection policies 126 in FIG. 7 as follows. Based on the condition indicated by the policy of the priority level "001", namely "exclude a configuration including a service having a version for which a symptom with a severity rank of AA or higher is registered in the problem area management DB", the function fallback rate calculation unit 115 refers to the problem area management DB 128 (FIG. 11) and identifies the "serviceA" having the version "1.2.0" whose severity rank is "AAA". Then, the function fallback rate calculation unit 115 identifies configurations including the "service A" having the version "1.2.0" in the records in the service combination candidates 130, and excludes them from the service combination candidates 130.

Further, based on the condition indicated by the policy of the next priority level "002", namely "exclude a configuration not including a function whose use frequency for the past month is in the top 20%", the function fallback rate calculation unit 115 refers to the API execution history information 1271 (FIG. 9) and the API-function correspondence table 1253 (FIG. 5) for the past month, and creates the function use frequency information 1272 (FIG. 10). Specifically, the function fallback rate calculation unit 115 counts the records in the API execution history information 1271 for the past month using a value of each API name 1302 as a primary key, and calculates the percentage of the records of the API name in the records of all the API names as a value for the execution percentage 1902. Further, the function fallback rate calculation unit 115 searches the API-function correspondence table 1253 to identify the function name corresponding to the API name, and replaces, with this function name, the API name for which the value of the execution percentage 1902 has been calculated above.

Further, the function fallback rate calculation unit 115 refers to the function retaining table 1254 (FIG. 6), and acquires values of the provider service 2002 whose corresponding functions are in the top 20% among the functions in the function use frequency information 1272 and also acquires their corresponding values of the version 2003. In the example of the function use frequency information 1272 exemplified in FIG. 10, the functions "A" to "D" account for 99% of use frequency, and configurations not including the version "1.1.0" of the "service B" providing the function "D" are excluded from the service combination candidates 130.

Lastly, based on the condition indicated by the policy of the next priority level "003", namely "exclude a configuration not including the function E", the function fallback rate calculation unit 115 excludes configurations not including the version "1.2.0" of the "service C" from the service combination candidates 130 as configurations not including the "function E". As a result of this exclusion, records of the candidate IDs "16" and "17" are extracted from the service combination candidates 130.

Next, the function fallback rate calculation unit 115 issues a reliability level calculation request to the reliability level calculation unit 116 using as an input the system configuration candidates extracted through the filtering in S801 on the "system α" to be deployed (S802).

Further, the function fallback rate calculation unit 115 selects one of the system configuration candidates above whose reliability obtained by S802 is the highest, and registers a system configuration indicated by the selected candidate in the system configuration information management DB 125 for the "system α" to be deployed (S803).

For instance, assume a case where information on reliability acquired from the reliability level calculation unit 116 is information on the version "1.3.0" (the service A: 1.1.0, the service B: 1.1.0, the service C: 1.1.0), which is a configuration closest to the system configurations of the system configuration candidates. In this case, the function fallback rate calculation unit 115 selects, as a system configuration with the highest level of reliability, the system configuration of the candidate ID "17", which is closer to the configuration of the above version "1.3.0" among the candidates. Note that the reliability level used here is information calculated by the reliability level calculation unit 116 in response to the reliability level calculation request issued in S802 above.

Next, the function fallback rate calculation unit 115 returns the system configuration registered in S803 to the system configuration selection unit 114 as a return value (S804), and ends the processing. In response to the return of this return value, the system configuration selection unit 114 returns the return value to the system configuration management unit 110 as a deployment configuration. The system configuration management unit 110 issues a deployment request to the system deployment unit 111 using this return value as an input. In the production environment 300 of the "system α", the system deployment unit 111 deploys the return value, namely the system configuration registered by the function fallback rate calculation unit 115, as a system configuration for problem tackling.

(Flow Example 8)

Figure 21:
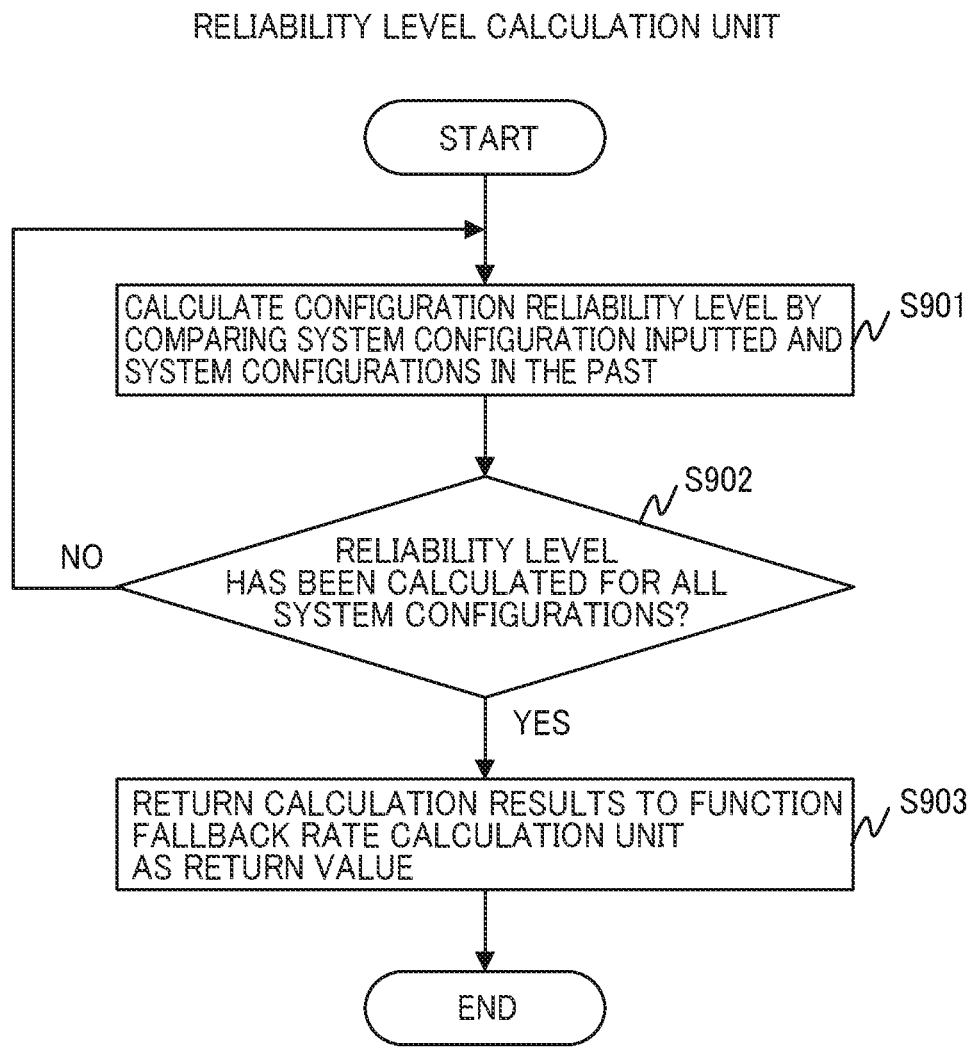
FIG. 21 is a diagram illustrating flow example 8 according to the present embodiment.

Next, a description is given of processing performed by the reliability level calculation unit 116 in response to the reliability level calculation request issued in S802 above. FIG. 21 is a diagram illustrating the flow example 8 of the version management method according to the present embodiment.

In this processing, the reliability level calculation unit 116 compares the system configuration indicated by each of the system configuration candidates (the candidate IDs "16" and "17") with the system configurations having operational track records (the configurations the records for which are registered in the operational track record information DB 129), and calculates a reliability level of each of the system configuration candidates (S901).

Specifically, from the records in the operational track record information DB 129, the reliability level calculation unit 116 extracts the values of the update date and time 1201 corresponding to values of the version 1202 formed only by service versions not exceeding the service versions of the candidates (the candidate IDs "16" and "17").

The service versions of the candidate ID "16" areas follows: "1.0.0" for the "service A", "1.1.0" for the "service B", and "1.2.0" for the service C. Similarly, the service versions of the candidate ID "17" are as follows: "1.1.0" for the "service A", "1.1.0" for the "service B", and "1.2.0" for the service C. Therefore, among the records in the operational track record information DB 129, the values of the update date and time 1201 are extracted from the records whose version is formed only by versions not exceeding the "service A": "1.1.0", the "service B": 1.1.0", and the "service C": "1.2.0", i.e., the version "1.0.0", "1.1.0", "1.2.0", and "1.3.0".

In the example illustrated in FIG. 12, for instance, the update date and time "2012 05-13 10:00:00" is extracted for the version "1.0.0", the update date and time "2012 07-20 15:00:00" for the version "1.1.0", the update date and time "2012 07-28 05:00:00" for the version "1.2.0", and the update date and time "2012 08-14 15:00:00" for the version "1.3.0".

Next, the reliability level calculation unit 116 checks each of the values of the update date and time 1201 extracted above against the development information table 1252, identifies the versions 1602 of the services whose creation date and time 1600 is before and closest to the date and time indicated by the update date and time 1201, and identifies the versions of the services for the version 1202 of the "system α".

For instance, the reliability level calculation unit 116 checks the update date and time "2012 08-14 15:00:00" of the version "1.3.0" of the "system α" against the development information table 1252, and identifies the versions 1602 of services whose creation date and time 1600 is before and closest to the update date and time "2012 08-14 15:00: 00", i.e., the version "1.1.0" for the "service A", the version "1.1.0" for the "service B", and the version "1.1.0" for the "service C".

Next, the reliability level calculation unit 116 determines, as a level of reliability, a degree of agreement between the service versions of each of the versions "1.0.0" to "1.3.0" of the "system α" obtained above and the service versions of each of the candidates. For instance, when the service versions of the version "1.3.0" of the "system α" (the "service A": "1.1.0", the "service B": "1.1.0", and the "service C": "1.1.0") are checked against the service versions of the candidate ID "16" (the "service A": "1.0.0", the "service B": "1.1.0", and the "service C": "1.2.0"), they agree in the version of the "service B", and hence the level of reliability is determined as "1/3". Similarly, when the service versions of the version "1.3.0" of the "system α" are checked against the service versions of the candidate ID "17" (the "service A": "1.1.0", the "service B": "1.1.0", and the "service C": "1.2.0"), they agree in the versions of the "service A" and the "service B", and hence the level of reliability is determined as "2/3". The reliability level calculation unit 116 thus determines the level of reliability for each of the candidates with respect to each of the versions of the "system α".

Next, the reliability level calculation unit 116 compares the levels of reliability of the candidates determined as described above in connection with each of the versions "1.0.0" to "1.3.0" of the "system α", and identifies the version with the highest level of reliability and the candidate for which the highest level of reliability is obtained. In other words, from the system configurations with operational track records, one closest to the system configurations of the candidate is identified. In the example given above, the version with the highest level of reliability is "1.3.0" (the "service A": "1.1.0", the "service B": "1.1.0", and the "service C": "1.1.0"), and the candidate for which the highest level of reliability is obtained is "17" with the level of reliability being "2/3".

Further, the reliability level calculation unit 116 determines whether a level of reliability has been determined for each of the versions "1.0.0" to "1.3.0" of the "system α", i.e., all the system configurations to be processed (S902).

If, on the one hand, it is determined that the level of reliability has not been determined for all the system configurations to be processed (S902: NO), the reliability level calculation unit 116 proceeds back to S901.

If, on the other hand, it is determined that the level of reliability has been determined for all the system configurations to be processed (S902: YES), the reliability level calculation unit 116 returns calculation results (the highest level of reliability and the candidate) obtained in S901 above to the function fallback rate calculation unit 115 as a return value (S903), and ends the processing.

The present embodiment generates a system configuration of a target system based on information on services that possibly constitute the target system and release histories of the services, so that a configuration that has not existed in the past can be set as a problem tackling candidate used upon occurrence of a problem. Further, in selecting a problem tackling candidate from configurations whose rate of fallback of functions is a predetermined level or below, the present embodiment can select as the problem tackling candidate a configuration similar to a configuration with an actual operational track record in the past, in other words, the present embodiment can select a configuration with a highly effective operational track record.

In other words, the present embodiment can provide a reliable system configuration for a system by allowing the system to provide functions at a minimized fallback rate even when the system is restored due to occurrence of a problem.

The descriptions herein provide at least the following. Specifically, the version management system of the present embodiment may be such that the storage device further retains information on histories of execution of APIs related to the system in a predetermined period of time, the arithmetic device further executes processing to identify a function executed in the predetermined period of time by checking the histories of execution against predetermined information defining relations between the APIs and functions, and determine a use frequency of the identified function by checking the identified function against predetermined information defining relations between functions and services with versions also included, and in the exclusion processing, the arithmetic device further executes processing to exclude, from the patterns in the list, the pattern that does not include a function the use frequency of which is equal to or above a predetermined level.

This can prevent a fallback of not only functions specified beforehand as essential functions, but also functions used frequently in the target system.

Further, the version management system of the present embodiment may be such that the arithmetic device compares an average update interval of the system and an average update interval of a predetermined system group including the system, and executes the generation processing, the exclusion processing, and the identification processing when the average update interval of the system is shorter than the average update interval of the system group including the system.

This can precisely avoid function fallback due to restoration in view of the current circumstances where development target systems are updated much more frequently than before.

Further, the version management method of the present embodiment may be such that the information processing system further retains, in the storage device, information on histories of execution of APIs related to the system in a predetermined period of time, the information processing system further executes processing to identify a function executed in the predetermined period of time by checking the histories of execution against predetermined information defining relations between the APIs and functions, and determine a use frequency of the identified function by checking the identified function against predetermined information defining relations between functions and services with versions also included, and in the exclusion processing, the information processing system further executes processing to exclude, from the patterns in the list, the pattern that does not include a function the use frequency of which is equal to or above a predetermined level.

Further, the version management method of the present embodiment may be such that the information processing system compares an average update interval of the system and an average update interval of a predetermined system group including the system, and executes the generation processing, the exclusion processing, and the identification processing when the average update interval of the system is shorter than the average update interval of the system group including the system.

REFERENCE SIGNS LIST 10 network
100 version management system
101 storage device
102 programs
103 memory
104 CPU (arithmetic device)
105 communication device
110 system configuration management unit
111 system deployment unit
112 system operational track record collection unit
113 system change detection unit
114 system configuration selection unit
115 function fallback rate calculation unit
116 reliability level calculation unit
117 policy setting unit
125 system configuration information management DB
1251 configuration information table
1252 development information table
1253 API-function correspondence table
1254 function retaining table
126 configuration selection policies
127 function use frequency information DB
128 problem area management DB
129 operational track record information DB
130 service combination candidates (list)
200 development environment
225 system development management DB
300 production environment
310 problem occurrence detection unit
320 service

The invention claimed is:

1. A version management system comprising:
a storage device that retains information on version histories of services each providing a predetermined function in a predetermined system; and
an arithmetic device that executes
processing of generating, based on the information on the version histories, a list of combination patterns of versions of the respective services as system configurations of the predetermined system,
processing of excluding, from the patterns in the list, the pattern whose function fallback rate is equal to or above a predetermined level, the function fallback rate being based on predefined necessary functions, and
processing of identifying, in the patterns remaining in the list after the exclusion, the pattern whose similarity to a system configuration having a predetermined past operational track record is equal to or above a predetermined level, as a system configuration to which the predetermined system is to be restored upon occurrence of a problem.

2. The version management system according to claim 1, wherein the storage device further retains information on histories of execution of APIs related to the predetermined system in a predetermined period of time, the arithmetic device further executes processing of identifying a function executed in the predetermined period of time by checking the histories of execution against predetermined information defining relations between the APIs and functions, and determining a use frequency of the identified function by checking the identified function against predetermined information defining relations between functions and services with versions also included, and in the exclusion processing, the arithmetic device further executes processing of excluding, from the patterns in the list, the pattern that does not include a function the use frequency of which is equal to or above a predetermined level.

3. The version management system according to claim 1, wherein
the arithmetic device compares an average update interval of the predetermined system and an average update interval of a predetermined system group including the predetermined system, and executes the generation processing, the exclusion processing, and the identification processing when the average update interval of the predetermined system is shorter than the average update interval of the system group including the predetermined system.

4. A version management method implemented by an information processing system including a storage device that retains information on version histories of services each providing a predetermined function in a predetermined system, comprising:
generating, based on the information on the version histories, a list of combination patterns of versions of the respective services as system configurations of the predetermined system;
excluding, from the patterns in the list, the pattern whose function fallback rate is equal to or above a predetermined level, the function fallback rate being based on predefined necessary functions; and
identifying, in the patterns remaining in the list after the exclusion, the pattern whose similarity to a system configuration having a predetermined past operational track record is equal to or above a predetermined level, as a system configuration to which the predetermined system is to be restored upon occurrence of a problem.

5. The version management method according to claim 4, wherein
the information processing system further retains, in the storage device, information on histories of execution of APIs related to the predetermined system in a predetermined period of time, the information processing system further executes identifying a function executed in the predetermined period of time by checking the histories of execution against predetermined information defining relations between the APIs and functions, and determining a use frequency of the identified function by checking the identified function against predetermined information defining relations between functions and services with versions also included, and in the exclusion processing, the information processing system further executes excluding, from the patterns in the list, the pattern that does not include a function the use frequency of which is equal to or above a predetermined level.

6. The version management method according to claim 4, wherein the information processing system compares an average update interval of the predetermined system and an average update interval of a predetermined system group including the predetermined system, and executes the generation processing, the exclusion processing, and the identification processing when the average update interval of the predetermined system is shorter than the average update interval of the predetermined system group.

* * * * *